United States Patent [19]

Fiesel

[11] Patent Number: 5,349,621
[45] Date of Patent: Sep. 20, 1994

[54] METHOD AND CIRCUIT ARRANGEMENT FOR TRANSMITTING DATA BLOCKS THROUGH A BUS SYSTEM

[75] Inventor: Wolfgang Fiesel, Markgröningen, Fed. Rep. of Germany

[73] Assignee: Alcatel N.V., Netherlands

[21] Appl. No.: 968,384

[22] Filed: Oct. 29, 1992

[30] Foreign Application Priority Data

Oct. 29, 1991 [DE] Fed. Rep. of Germany ....... 4135553

[51] Int. Cl.$^5$ ............................................ H03K 21/02
[52] U.S. Cl. .................................... 377/44; 377/55; 377/56; 365/189.03; 365/191; 365/236; 365/230.08
[58] Field of Search ............................... 377/44, 55–56; 365/189.03, 191, 236, 230.08

[56] References Cited

U.S. PATENT DOCUMENTS 5,166,903  11/1992  Aichelmann, Jr. ............ 365/189.03

FOREIGN PATENT DOCUMENTS

3824306A1   1/1990  Fed. Rep. of Germany .
39117730A1 12/1990  Fed. Rep. of Germany .

Primary Examiner—Margaret Rose Wambach
Attorney, Agent, or Firm—Ware, Fressola, Van Der Sluys & Adolphson

[57] ABSTRACT

In the transmission of variable length data blocks, where data and addresses share the same bus lines, one of the other signals, which are present anyway (chip-select, CS-, read, write), indicates the block length. The first time slot following the setting of this signal is designated for an address (starting address), all subsequent time slots are designated for data, until the signal is reset. In this way, the length of the data block need not be known at the beginning of the transfer.

7 Claims, 2 Drawing Sheets

METHOD AND CIRCUIT ARRANGEMENT FOR TRANSMITTING DATA BLOCKS THROUGH A BUS SYSTEM

TECHNICAL FIELD

The invention concerns a method of transmitting data blocks through a bus system containing common lines for addresses and data, and a circuit arrangement for connection to such a bus system.

BACKGROUND OF THE INVENTION

It is generally known to use a bus system to interconnect several groups of components or units of a larger system. Such a bus system has lines for addresses, lines for data, control lines and timing lines. The power supply lines can also be counted in the bus system. By entering an address in the address lines, a certain group of components or a unit is selected, often even a subassembly or a subunit contained therein, possibly a single memory location in a group of memories. A decision is made with control lines, among others, whether the selected group of components will receive or emit data. The data are then transmitted through the data lines. The time of the process is controlled by control lines, timing lines or a combination thereof.

Some bus systems are known, in which the lines for addresses and the lines for data are identical and addresses and data occupy different places in time.

A reason for this is the desire to keep the number of lines, thereby also the number of connection pins of the groups of components and plugs, and finally also the outside dimensions, small.

A further reason is that it is not always possible to clearly differentiate between address and data. On the one hand, entering the address into a selected group of components may already be enough to trigger a very specific sequence in this group of components, without the need for separate control data. On the other hand data, which were transmitted to another group of components, can be used there to address subgroups of components.

It is also known to separate the addresses into two parts (e.g. higher-value and lower-value bytes), and to successively transmit both parts through the same lines. In the same way it is possible, after the transmission of an address, to transmit an entire data block of a determined length in successive parts through the same lines.

DISCLOSURE OF INVENTION

An object of the invention is to enable the transmission of a variable length data block through such a bus system.

A known solution of this task consists in first transmitting a data word after the address, which indicates the length of the present data block, and then to transmit the actual data.

An object of the present invention is fulfilled by a method of transferring data blocks over a bus system having common address and data lines, wherein the length of a data block is indicated by one of the other signals in the bus system.

According to the basic idea of this invention, one of the remaining signals, which are present anyway (chip select, read, write), indicates the length of the block. The first time slot following the setting of this signal is designated for an address (starting address), all subsequent time slots are designated for data, until the signal is reset.

In further accord with the present invention, a counter counts the first time slots of a data block, and successively releases a receiver for the first and another address byte, receiver or transmitter for data, and finally a count signal to increase the address. The counter is reset at the end of the block.

A counter (FF1, FF2, FF3) counts the first time slots of a data block and successively releases a receiver (ZH, ZL) or a transmitter for the first (AH) and possibly other (AL) address bytes, a transmitter or receiver (MEM) for data (D1, D2, D3), and finally a count signal (ZS) to increase the address. The counter is reset at the end of the block.

This solution also has the advantage that the length of a data block need not be known at the beginning of the transmission.

An apparatus, according to the present invention, comprises a counting and decoding facility which is enabled at the beginning of the data block by a signal applied to a line of the bus system and indicating the length of the data block, then incremented up to final count by a clock signal applied to a clock line of the bus system, and disabled and reset at the end of the data block, and which enables the address transfer at the beginning of the data block and the data transfer thereafter.

The invention will now be explained by means of a configuration example, with the aid of the attached drawing.

BEST MODE FOR CARRYING OUT THE INVENTION

Figure 1:
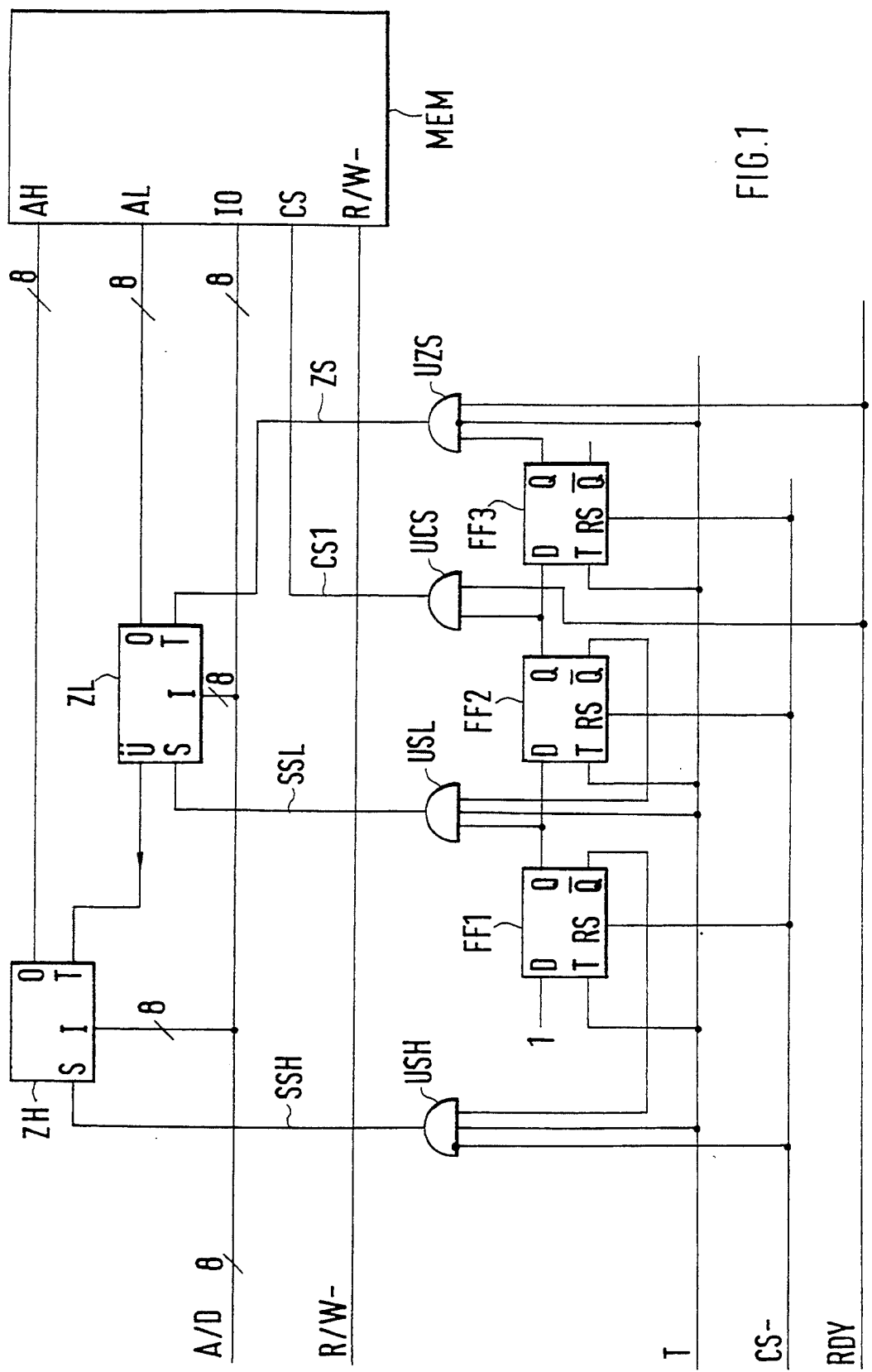
FIG. 1 shows a block diagram of a circuit arrangement according to the invention.

The circuit arrangement in FIG. 1 shows a bus system consisting of eight address and data lines A/D, a read-write-line R/W, a timing line T, a chip-select-line CS-, and a line for an additional signal, the ready line RDY, which indicates when valid data are actually input into the bus system for transmission. In the following, the same symbols are used for the signals in these lines, as for the lines themselves. The identifications of the signals also correspond to the identifications of the lines, for example a timing signal for the signal in the timing line. (In this instance, the symbol of the inversion is an added minus sign suffix, and not a bar or hyphen on top, as is usual).

In addition, the circuit arrangement in FIG. 1 has three flip-flops FF1, . . ., FF3, which may be D flip-flops available from National Semiconductor as part number MM 74 C 74, (dual D flip-flop), two settable counters ZH and ZL, which may be a presettable, binary/decade, up/down counter, also from National Semiconductor as part number CD 4029, a memory MEM, as well as four AND-gates USH, USL, UCS and UZS.

The construction of the circuit arrangement and its operation will now be described in more detail by means of the two figures:

In this instance, the chip-select-signal CS- is also used as the signal that indicates the length of the block, in accordance with the invention. It is assumed in this example that, for each data block, a higher-value or most significant bit address byte AH is first transmitted to the common address and data lines A/D, then a least significant or lower-value address byte AL, and subsequently a series of data bytes D1, D2.... It should be permissible for waiting times to occur inside the data block. The times during which data bytes are actually present, are therefore indicated by the ready signal RDY.

The three flip-flops FF1, FF2 and FF3 are used to indicate the occurrence of the first, second and third time interval after the beginning of a data block. Each of these flip-flops have a reset input RS, a timing input T, a data input D, a (noninverting) output Q and an inverting output Q. As long as the reset input RS is present in logic "1" the output Q is at logic "0". If the reset input RS is at logic "0", the logic value applied at the data input D is transferred at the output Q on each transition from logic "1" to logic "0" at the clock input T.

As long as no data block is being transmitted, the flip-flops are blocked when the reset inputs RS of the three flip-flops are connected to the select-chip-line CS-. The data input D of the first flip-flop FF1 is always in logic "1". Each of the data inputs D of the subsequent flip-flops FF2 and FF3 are connected to the output Q of the preceding flip-flop FF1 or FF2. The timing inputs T are connected to the timing line T. The flip-flops then indicate when the first (FF1), the second (FF2) and the third (FF3) timing pulse has passed the timing line T, after being released by the chip-select-signal CS-.

The AND-gate USH is connected to the chip-select-line CS- through an inverting input, and through two noninverting inputs to the timing line T, and to the inverting output Q- of the first flip-flop FF1. In this way its output supplies the first timing pulse, after the beginning of the data block, as the setting signal SSH for the higher-value address byte to a setting input S of the settable counter ZH. This counter ZH furthermore has eight data inputs I, which are connected to the eight address and data lines A/D. The counter ZH also has a timing input T, eight data outputs 0 and a not drawn transmission output Ü.

Figure 2:
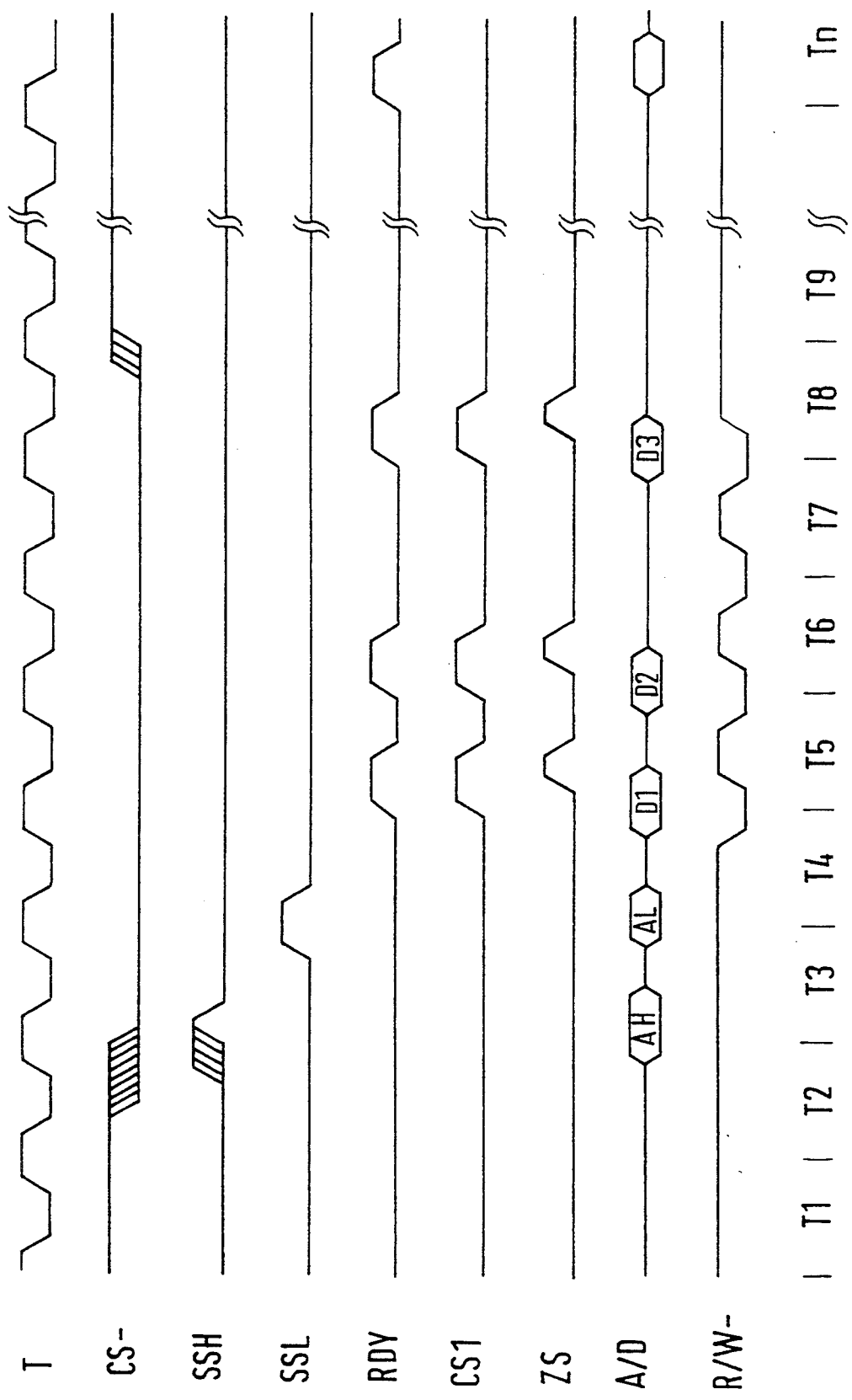
FIG. 2 shows a pulse diagram of the circuit arrangement in FIG. 1, which functions in accordance with the method of the invention.

FIG. 2 shows the different signals for different time intervals T1,..., T9 and Tn. After the chip-select-signal CS- =0 was activated during time interval T2, the higher-value address byte AH is received by the counter during time interval T3, while the side of setting signal SSH drops.

The AND-gate USL has three noninverting inputs, which are connected to the output Q of the first flip-flop FF1, the inverting output Q- of the second flip-flop FF2, and the timing line T. Its output is connected to the setting input S of counter ZL, which has the same configuration as counter ZH. In this way, at the beginning of the data block, the second timing pulse is supplied to counter ZL as the setting signal SSL for the lower-value address byte AL. This takes place during time interval T4.

Data bytes can be transmitted during the subsequent time intervals. To that effect, the ready signal RDY is provided along with the output signal of flip-flop FF2 to AND-gate UCS, which provides a new chip-select-signal CS1 for memory MEM.

Memory MEM has eight address inputs AH for the higher-value address byte, which are connected to the outputs 0 of counter ZH; it has eight address inputs AL for the lower-value address byte, which are connected to the outputs 0 of counter ZL; it has eight data inputs and outputs IO, which are connected to the address and data lines A/D; it has a chip-select-input CS, which is connected to the output of AND-gate UCS; and it has a control input R/W-, which is connected to the read-write-line R/W-.

During time intervals T5, T6 and TS, one each data byte is now entered into the memory MEM, or is retrieved from it. The direction is specified by the read-write-signal R/W-, the example in FIG. 2 shows data being entered. The address must be increased by one after each entered or retrieved data byte. To that effect, a count signal ZS is produced by the AND-gate UZS from the output signal of flip-flop FF3, the inverted timing pulse and the ready signal RDY, and is supplied to the timing input of counter ZL. The transmission output U of counter ZL is connected to the timing input T of counter ZH.

In this way, data bytes can be transmitted in one or the other direction, during any number of subsequent time intervals. Possible pauses can occur, as shown in the example of time interval T7. The transmission direction in the example could even be inverted by the read-write-signal R/W inside the data block, which, however, has no practical application. If the data transmitting place contains no more data, which is the case at the end of time interval T8 in this instance, the end of the data block is indicated by the chip-select-signal CS- returning to logic "1". The flip-flops are reset; no further data are considered, as shown in time interval Tn.

The following indicates several modification possibilities of the described example, to clarify the area of application of the present invention:

The address size could be reduced to one address byte, by omitting the flip-flop FF2, the AND-gate USL and counter ZL. In that event, the data input D of flip-flop FF3 would have to be connected to the output of flip-flop FF1, and the timing input T of counter ZH to the output of AND-gate UZS.

Inversely, each address area could be increased by one byte, by inserting another flip-flop, another AND-gate and another counter.

The delay of the count signal ZS caused by the flip-flop FF3 until the first data byte has been transmitted, could be omitted if the starting address of the address value, which was reduced by "one" is transmitted instead.

At first, a select signal of the chip-select-signal type is often formed from the existing address. This select signal would then have to be linked to another signal indicating the length of the data block, and take the place of the chip-select-signal CS- in the example. Of course, a separate block length signal could also be used to indicate the length of the block. Separate read and write signals are suggested in this instance, which, on the one hand, indicate the transmission direction, and the block length on the other. A signal formed from these separate signals by an OR-circuit would then indicate the block length. In that event, the read and write signals would have to be linked to the timing signal.

Instead of the shown components, others could be used, which fulfill the same function; the functions of the AND-gates, in particular, could be performed by suitably connected inverter-, NAND- and NOR-gates.

The flip-flops and the AND-gates perform the function of a counter and a decoder, at least partially, and could therefore also be replaced by them.

Any other circuit, receiving or emitting addressable data blocks, could be used instead of the memory MEM. If this circuit also had to input the required addresses to the address and data lines, the counters ZH and ZL would have to be replaced by buffer circuits, for example, which would be activated by the setting signals SSH and SSL (now called by different names) for the address and data lines. Addresses could be transmitted in both directions by counters and buffer circuits connected in parallel. A suitable switching arrangement would have to be provided. When the addresses come from the bus system, or reach the bus system through a circuit arrangement according to the invention, it is necessary to switch the origin of the other control signals such as the read-write-signal and the ready signal, in the same manner. This requires a usual arrangement of groups of components that are switchable between master and slave, for which the usual arbitration procedures can be used.

Part or all of the circuit arrangement of the invention, which represents an interface circuit between combined address and data lines on the one hand, and separate address and data lines on the other, can also be functionally or constructively linked to the circuit being connected to the bus system (memory MEM in the example). Individual functions, in particular, can also be program controlled.

I claim:

1. A method of transferring data blocks over a bus system comprising common lines for providing address and data signals regulated by timing signal pulses, comprising the steps of:
   providing a data transfer enable signal for enabling a data block transfer during a selected period of successive timing signal pulses;
   receiving a starting memory address on the common lines for storing or retrieving a first data signal to or from the starting memory address in the presence of one of the successive timing signal pulses in the selected period; and
   storing or retrieving additional data signals on the common lines at successive memory addresses in the presence of additional ones of the successive timing signal pulses in the selected period, wherein the length of the selected period is indicated by the length of the data transfer enable signal.

2. A method as claimed in claim 1, wherein the enable signal used to indicate the length of the selected period is a chip-select, read or write signal.

3. A method as claimed in claim 1, wherein after the enable signal has been provided and the starting address is provided, the remainder of the selected period is reserved for the transfer of the data signals.

4. A method as claimed in claim 1, further comprising the step of receiving an additional signal indicative of when valid data is actually applied to the common lines for further enabling the data block transfer by enabling the storing or retrieving of the additional data signals on the common lines at the successive memory addresses.

5. A circuit arrangement for connection to a bus system comprising common lines (A/D) for addresses and data, for the purpose of transferring data blocks, comprising: a counting and decoding facility (FF1, FF2, FF3, USH, USL, UCS, UZS), wherein the counting and decoding facility is enabled at the beginning of the data block by a signal (CS-) applied to a line (CS-) of the bus system and indicating the length of the data block, then incremented up to final count by a clock signal (T) applied to a clock line (T) of the bus system, and disabled and reset at the end of the data block, and wherein the counting and decoding facility enables the address transfer at the beginning of the data block and the data transfer thereafter.

6. A circuit arrangement as claimed in claim 5, wherein a settable counter (ZH, ZL) is provided into which a starting address (AH, AL) can be entered from the common lines (A/D) for addresses and data at the beginning of the data block, and wherein said counter is incremented after each transferred data byte (D1, D2, D3) by a count signal (ZS) derived from the clock signal (T).

7. A circuit arrangement as claimed in claim 5, wherein a buffer circuit is provided which transfers a starting address to the common lines for addresses and data at the beginning of the data block.

* * * * *